Dec. 30, 1969 R. M. TIMMS 3,486,727
SUPPORT MEANS FOR A SADDLE
Filed Dec. 2, 1966
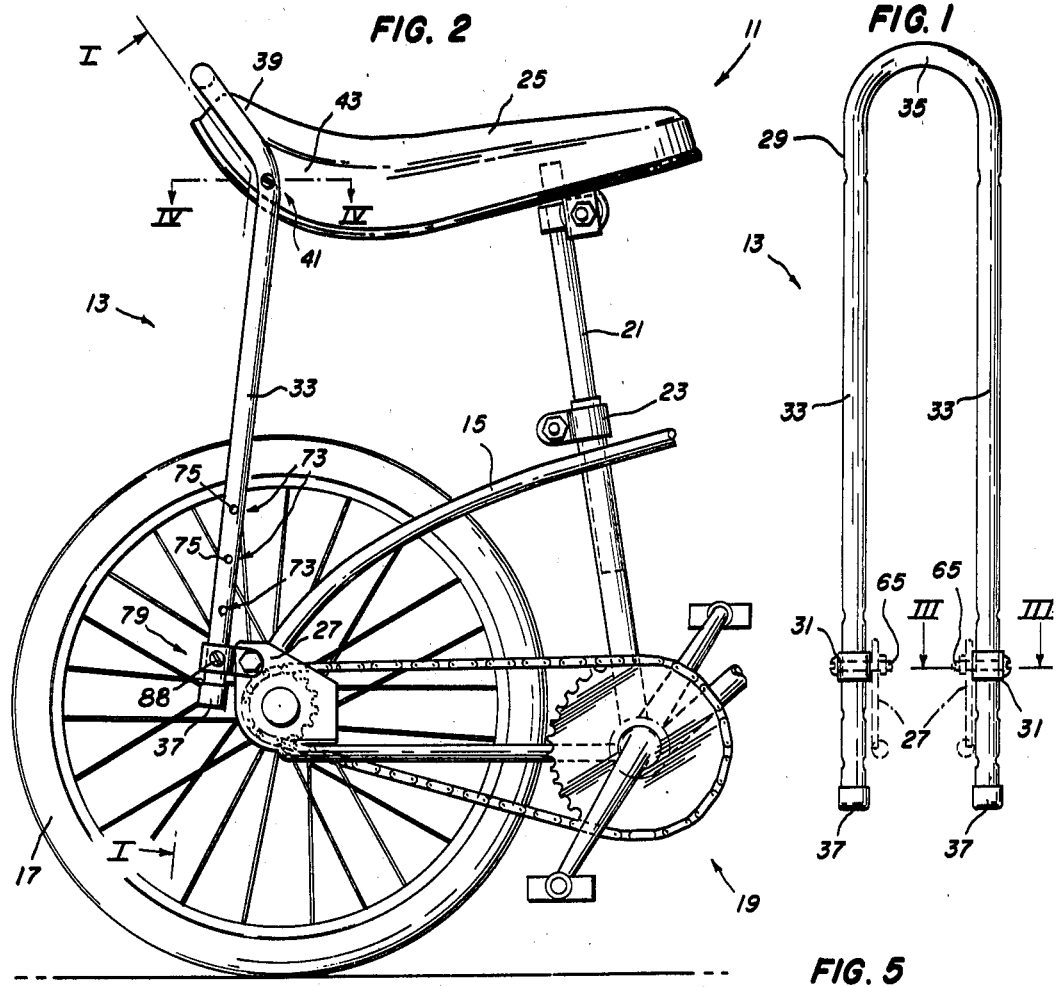
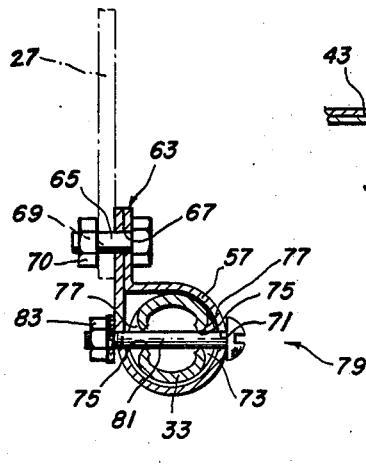
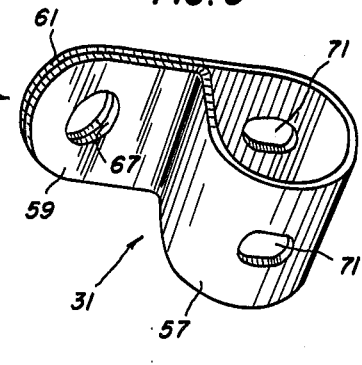
INVENTOR
RICHARD M. TIMMS
BY John R. Walker, III
Attorney

United States Patent Office 3,486,727
Patented Dec. 30, 1969

3,486,727
SUPPORT MEANS FOR A SADDLE
Richard M. Timms, Memphis, Tenn., assignor to Troxel Manufacturing Company, Moscow, Tenn.
Filed Dec. 2, 1966, Ser. No. 598,815
Int. Cl. B62j 1/00
U.S. Cl. 248—397           8 Claims

ABSTRACT OF THE DISCLOSURE

Support means for supporting an elongated bicycle saddle adjacent the forward and rearward ends thereof. The portion of the support means which is adjacent the forward end of the saddle having an adjustable post mounted onto the frame of the bicycle. The suport means which is adjacent the rearward end of the saddle having a depending brace means provided with a plurality of pairs of transverse apertures. Said rearward support means having clips and having fastening means extending through holes in the clips and through a selected pair of said transverse apertures for mounting the brace means from the bicycle to hold the rearward end of the saddle at a definite height corresponding to the position of the adjustable post.

BACKGROUND OF THE INVENTION

Field of the invention

Support for rearward end of an elongated bicycle saddle.

Description of the prior art

Previous supports for the rearward end of elongated bicycle saddles have had certain disadvantages, for example: They have been difficult to adjust, have not maintained a fixed position, and/or have not been sturdy. Thus, one of the prior devices includes a brace with a pair of flattened lower end portions having apertures therein which received the axle of the bicycle rear wheels and were held in place by the same nuts that held the axle onto the frame of the bicycle. With this type of support to change the height of the saddle, it was necessary to loosen the main axle bolts, take the flattened portions off the axle and place in another set of apertures, and then reassemble. This was a time consuming and difficult operation, and furthermore, this type of support can no longer be used with bicycles having speed changing mechanisms mounted on the axle since there is no room on the axle for the flattened end portions. Another type of support comprised a clamp-like arrangement around the rod which in many cases became ineffective because the clamp slipped on the rod after a period of use so that the rearward end of the saddle was no longer supported causing damage to the saddle. With this type of arrangement, there was no positive locking of the saddle at a definite height.

SUMMARY

The present invention is directed towards overcoming the heretofore-mentioned and other disadvantages in prior supports for elongated bicycle saddles. One of the objects of the present invention is to provide support means for supporting the rearward end of an elongated saddle at a definite selected height whereby the saddle can be adjusted to fit the user, as for example, the average boy or girl from the ages of 6 through 16. The concept of the present invention is to provide clips which slidably fit respectively on the legs of the brace means, and to provide a plurality of pairs of transverse apertures in the legs, and removable fastening means each including a bolt extending through diametrically opposed holes in the clip and through a selected pair of the plurality of pairs of transverse apertures to hold the rearward end of the saddle at a definite selected height. Another feature of the present invention is to provide tapered entrance portions for the transverse apertures for ease in assembling and changing the height of the rearward end of the elongated saddle. An additional feature of the present invention is to provide a unique formation of the clip of the present invention which consists of a single piece of material having an intermediate portion establishing a band-like portion which is greater in inside diameter than the outside diameter of the legs of the brace and the opposite ends of the piece of material are in flat face-to-face engagement to establish a tab adapted to be attached to supporting structure adjacent the rearward wheel of the bicycle, and to provide opposed holes in the band-like portion which are elongated circumferentially thereof so that the clip is easy to install.

DESCRIPTION OF THE DRAWING

FIG. 1 is an elevational view showing the support means of the present invention and showing in broken lines a portion of the frame of a bicycle and as viewed from the rear thereof, and taken as on the line I—I of FIG. 2.

FIG. 2 is a fragmentary view of the rearward portion of a bicycle incorporating the support means of the present invention therewith and as viewed from a position substantially 90° from that of FIG. 1.

FIG. 3 is a sectional view on an enlarged scale taken as on the line III—III of FIG. 1.

FIG. 4 is a fragmentary sectional view on an enlarged scale taken as on the line IV—IV of FIG. 2.

FIG. 5 is a perspective view of one of the clips of the support means of the present invention.

DESCRIPTION OF THE PREFERRED EMBODIMENT

A typical bicycle 11 with which the support means 13 of the present invention is utilized is best shown in FIG. 2 where in it will be seen the bicycle 11 includes the usual frame 15, rear wheel 17, and drive mechanism 19 for the rear wheel. In addition, bicycle 11 includes the usual adjustable post 21 which is adjustably clamped or mounted on the frame 15 by the usual clamp 23 and which post is attached adjacent the upper end thereof to the front end of the elongated saddle 25, which is a part of the typical bicycle 11. Additionally, bicycle 11 includes the usual support structure 27 on either side of rear wheel 17 adjacent the central portion thereof and which is usually in the form of vertically extending plates that are a part of the frame 15.

The following is a description of the present invention and its relationship to the heretofore-described typical bicycle 11. The support means 13 of the present invention comprises in general a brace 29 and a pair of clips 31.

Brace 29 is preferably formed of a single piece of tubing which is bent in the form best seen in FIGS. 1 and 2 to establish a pair of depending legs 33 integrally interconnected adjacent the upper ends thereof by an arcuate intermediate portion 35. A pair of caps 37, formed of rubber, plastic or the like are respectively removably fitted on the lower ends of depending legs 33. Brace 29 is attached to the rearward end 39 of saddle 25 as by attachment means 41 respectively interconnecting the opposite sides or skirts 43 of the saddle 25 with the legs 33 adjacent the upper end thereof. Attachment means 41 are substantially alike, and the following description of one will suffice for both. It will be understood that only one of the attachment means 41 is shown in FIGS. 2 and 4, but that the other is of identical structure and on the opposite side of the saddle 25 from that shown.

Attachment means 41 preferably includes a bolt 45 extending through apertures 47, 49 in leg 33 and through aperture 51 in the side or skirt 43 of saddle 25, as best seen in FIG. 4, and a nut 53 secures the bolt 45 in place. Leg 33 is preferably tapered inwardly adjacent aperture 47 as at 55 for ease of insertion of the bolt 45 therethrough.

Both of the clips 31 are substantially alike, and the following description of one will suffice for both. Each clip 31 is preferably formed from a single flat piece of metal material and is bent into the shape best seen in FIGS. 3 and 5 so that the intermediate portion of the piece of material establishes a substantially cylindrical band-like portion 57 is larger than the outside diameter piece of material are bent in flat face-to-face engagement to establish a tab 63 extending outwardly from the band-like portion in substantially a tangential relationship relative to the band-like portion. The inside diameter of band-like portion 57 is larger than the outside diameter of the leg 33 upon which mounted so that the clip 31 and the leg are freely movable relative to each other before the installation has been completed, as will hereinafter be described. The clips 31 are respectively secured to the support structures 27 of the bicycle as by means of the nut-bolt fastening assemblies, each of which includes a bolt 65 extending through the aperture 67 in tab 63 and the aperture 69 in support structure 27. Band-like portion 57 is provided with a pair of transversely extending and diametrically opposed holes 71 therethrough. Holes 71 are preferably elongated in a circumferential direction relative to the band-like portion.

The means for fastening the clips 31 respectively to the depending legs 33 are identical and the following description of one will suffice for both. Each of the depending legs 33 is provided with a plurality of pairs 73 of transverse apertures 75. The pairs 73 are vertically spaced along the legs as best seen in FIG. 1. Adjacent each of the apertures 75 the leg 33 is tapered as at 77. Removable fastening means 79, which includes a bolt 81 extending through holes 71, and a selected pair of apertures 75 is provided to hold the rearward end 39 of saddle 25 at a definite selected height. Fastening means 79 also includes a nut 83 preferably having a well-known type of star-like lock washer attached thereto. Nut 83 is threaded onto bolt 81 to retain the bolt in place, as best seen in FIG. 3. It will be understood that the heretofore-mentioned tapered portions 77 form an important part of the present invention since it provides for easy and quick insertion of the end of the bolt 81 through the aperture 75. In other words, the tapered portion acts as a guiding entrance into the aperture 75 on the side of the leg 33 from which the bolt 81 is inserted. It will be understood that the taper on the opposite aperture is useful if it is desired to insert the bolt from the other side of the leg. Also, it will be understood that the elongated holes 71 in clip 31 permit alignment of the holes with the pairs 73 of apertures 75, particularly in the event that the positioning of the clip 31 is such that if the holes were not elongated, they would not be in exact alignment with the apertures 75. Furthermore, it will be understood that the fastening means 79 gives a positive locking, and even if the nut 83 were loose or became detached from the bolt 81, the saddle 25 would not move but would be retained by the bolt 81. In addition, the height of the saddle 25 can easily be changed from one position to another.

It is contemplated that with the present invention the saddle 25 can be adjusted to fit the average user, as for example, the average boy or girl from the ages of 6 through 16. Thus, for example, the highest adjustment as shown in FIG. 2 is best adapted for ages 15 through 16, the next pair 73 of apertures 75 above the pair in which the bolt 81 is located in FIG. 2 is for ages 12–14, the next pair for ages 9–11, and the top pair for ages 6–8. It will be understood that normally the saddle 25 would be maintained in a substantially horizontal position as shown in FIG. 2. In addition, it will be understood that the post 21 is adjusted by means of clamp 23 in the usual manner. Also, it will be understood that by the use of the present invention a bicycle is provided which can be made to correspond to all different sizes of bicycles. Thus, for example, to correspond to a 22" bicycle, the uppermost pair 73 of apertures 75 are utilized and the post 21 adjusted so that the saddle is horizontal. In this position the distance from the top of the saddle to the bottom pedal will be approximately 22".

The following is a recommended procedure for assembling the support means 13 of the present invention with the typical bicycle 11: (1) with caps 37 removed, place clips 31 over legs 33 at the desired setting. Put bolts 81 through the aligned apertures 75 and holes 71 and loosely screw on nut 83. (2) Attach tabs 63 loosely on support structure 27 as by the bolt 65 and nut 70. (In some cases it may be convenient to attach the tabs 63 to the rear coaster brake shaft with the use of a special attaching screw already on the bicycle.) (3) Place saddle 25 on adjustable post 21—loosely. (4) Assemble bolts 45 through apertures 47, 49, 51 and screw on nuts 53 loosely. (5) Adjust post 21 to desired height. (6) Tighten all nuts and bolts securely and install caps 37.

While the above practical embodiment of the invention has been disclosed, it will be understood that the specific details of construction shown are merely by way of illustration, and the invention may take other forms.

I claim:

1. In a bicycle having a saddle and an adjustable post supporting the front end thereof and having support structure adjacent the rear wheel of the bicycle, the improvement comprising a depending brace attached adjacent the upper end thereof to the rearward end of said saddle, said brace including a pair of depending legs, a pair of means for respectively attaching corresponding ones of said legs to said support structure for maintaining the height of said saddle at a definite selected height corresponding to the position of said adjustable post; each of said pair of means comprising means defining a plurality of vertically spaced pairs of transverse apertures in a corresponding one of said legs, a clip including a band-like portion loosely mounted on said corresponding one of said legs and a tab attached to said band-like portion and extending outwardly therefrom, means providing diametrically opposed holes in said band-like portion, means fastening said tab to said support structure, and removable fastening means including a bolt extending through said diametrically opposed holes and a selected pair of said plurality of pairs of transverse apertures to hold the rearward end of said saddle at a definite selected height.

2. The apparatus of claim 1 in which said brace is provided with a tapered entrance portion around at least one of said transverse apertures in each of said pairs of transverse apertures.

3. The apparatus of claim 1 in which said clip consists of a single piece of material having an intermediate portion establishing said band-like portion and having the opposite ends of said piece of material in flat face-to-face engagement to establish said tab.

4. The apparatus of claim 1 in which said opposed holes are elongated circumferentially relative to said band-like portion.

5. Brace means for the rearward end of a saddle of a bicycle having an adjustable post supporting the front end of the saddle and having support structure adjacent the rear wheel of the bicycle, said brace means comprising a depending brace, means attached to the upper end of said brace for attaching the brace to the rearward end of said saddle, said brace including a pair of depending legs, a pair of means for respectively attaching corresponding ones of said legs to said support structure for maintaining the height of said saddle at a definite selected height corresponding to the position of said adjustable post; each of said pair of means comprising means defining a plurality of vertically spaced pairs of transverse apertures in a corresponding one of said legs, a clip including a band-like portion loosely mounted on said corresponding one of said legs and a tab attached to said band-like portion and extending outwardly therefrom, means providing diametrically opposed holes in said band-like portion, means engageable with said tab for fastening said tab to said support structure, and removable fastening means including a bolt extending through said diametrically opposed holes and a selected pair of said plurality of pairs of tarnsverse apertures for holding the rearward end of said saddle at a definite selected height.

6. The apparatus of claim 5 in which said brace is provided with a tapered entrance portion around at least one of said transverse apertures in each of said pairs of transverse apertures.

7. The apparatus of claim 5 in which said clip consists of a single piece of material having an intermediate portion establishing said band-like portion and having the opposite ends of said piece of material in flat face-to-face engagement to establish said tab.

8. The apparatus of claim 5 in which said opposed holes are elongated circumferentially relative to said band-like portion.

UNITED STATES PATENTS

References Cited

| | | | |
|---|---|---|---|
| 507,514 | 10/1893 | Warwick | 248—161 XR |
| 1,156,567 | 10/1915 | Vermeer | 280—299 |
| 2,350,582 | 6/1944 | Booth. | |
| 2,790,614 | 4/1957 | Miller | 248—74 |
| 2,882,066 | 4/1959 | Petrak. | |
| 3,258,290 | 6/1966 | Karbin | 297—195 |
| 3,353,781 | 11/1967 | Gutner | 248—157 XR |
| 1,026,115 | 5/1912 | Palin et al. | 297—198 |

FOREIGN PATENTS 300,011  11/1928  Great Britain.

ROY D. FRAZIER, Primary Examiner

U.S. Cl. X.R.

280—289; 297—195